(12) United States Patent
Weber

(10) Patent No.: US 9,141,417 B2
(45) Date of Patent: *Sep. 22, 2015

(54) METHODS AND SYSTEMS FOR INTEGRATED STORAGE AND DATA MANAGEMENT USING A HYPERVISOR

(71) Applicant: NetApp, Inc., Sunnyvale, CA (US)

(72) Inventor: Bret S. Weber, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,995

(22) Filed: Dec. 9, 2013

(65) Prior Publication Data

US 2014/0089925 A1    Mar. 27, 2014

Related U.S. Application Data

(63) Continuation of application No. 12/200,497, filed on Aug. 28, 2008, now Pat. No. 8,627,312.

(51) Int. Cl.
*G06F 9/455* (2006.01)
*G06F 3/06* (2006.01)

(52) U.S. Cl.
CPC ........ *G06F 9/45533* (2013.01); *G06F 9/45558* (2013.01); *G06F 3/0611* (2013.01); *G06F 3/0658* (2013.01); *G06F 3/0683* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,219,353 B2 | 5/2007 | Franklin et al. | |
| 7,849,327 B2 | 12/2010 | Leung et al. | |
| 8,468,591 B2 | 6/2013 | Silverstone | |
| 2008/0028408 A1* | 1/2008 | Day et al. | 718/104 |
| 2008/0040458 A1 | 2/2008 | Zimmer et al. | |
| 2008/0228971 A1* | 9/2008 | Rothman et al. | 710/104 |
| 2010/0306773 A1 | 12/2010 | Lee et al. | |
| 2011/0047310 A1* | 2/2011 | Bonola | 710/268 |
| 2011/0078682 A1 | 3/2011 | Doan et al. | |

* cited by examiner

*Primary Examiner* — Kenneth Tang
(74) *Attorney, Agent, or Firm* — Haynes and Boone, LLP

(57) ABSTRACT

Methods and systems for integrated data management and block level storage management in a storage system having a controller with a multi-core processor. A hypervisor manages the multi-core processor such that at least one processor is used in a first virtual machine on which a block level storage management process is operable. The first virtual machine may also operate under the control of a real-time operating system. The hypervisor also defines a second virtual machine using one or more other processor cores and operates a data management application process optionally under control of a general purpose operating system. The optional general purpose operating system and the data management application process access storage devices by communicating through the hypervisor with the block level storage management process operable in the first virtual machine.

20 Claims, 7 Drawing Sheets

METHODS AND SYSTEMS FOR INTEGRATED STORAGE AND DATA MANAGEMENT USING A HYPERVISOR

CROSS REFERENCE

This application is a continuation of U.S. application Ser. No. 12/200,497 filed Aug. 28, 2008, and entitled, "Methods and Systems for Integrated Storage and Data Management Using a Hypervisor," the entire disclosure of which is incorporated herein by reference.

BACKGROUND

1. Field of the Invention

The invention relates generally to storage systems and applications thereof and more specifically relates to use of hypervisor technology to integrate block level storage management and one or more higher layer data management applications in a storage system with a multi-core processor architecture.

2. Discussion of Related Art

Storage systems coupled to computing environments often utilize Redundant Array of Independent Disks (RAID) storage management to provide both high performance and high reliability in block level storage and retrieval of information. Often in large computing environments, other higher level data management functions are provided as network appliances positioned between the computing systems and the RAID storage systems. Though they may be physically housed within the storage system (i.e., same enclosure or rack), these network appliances are external device in logical term using separate processors and memory and coupled to the controller(s) of the storage system through interconnecting communication paths and protocols. Such higher level data management functions may include, for example, Network File System (NFS) protocol management. Other examples of higher level data management includes: other Network Attached Storage (NAS) data management functionality, storage virtualization, object oriented storage devices, content addressable storage devices, virtual tape storage management, Web browser interface services, diagnostic and performance tuning tools, etc.

These exemplary data management applications provide higher level data management functions useful in particular applications. As noted such higher level data management functions are typically provided as appliance devices external to the storage system and the computing system. The network appliance providing services and connectivity for computing systems to interact with the RAID storage subsystem.

Although some storage vendors may physically integrate such data management servers within the same enclosures as the RAID storage subsystem, such physical integration presents difficulties where the processing capabilities of a present-day multi-core processor is utilized. In such multi-core computing environments multiple CPUs are tightly coupled in a single integrated circuit and may share access to cache memory and main memory components. Although some higher level data management applications may be well adapted to optimal utilization of such multi-core processing environments (e.g., adapted for optimal parallel operation distributed on multiple core processors), most block oriented RAID storage management control functions are not presently architected for effective utilization of such parallel processing features in a multi-core processor environment. In particular, block oriented RAID storage management or other low level block oriented storage management features typically require real-time response and functionality to maintain desired performance and reliability in access to the mass storage devices within the storage subsystem (e.g., disk drives). Further, real-time operating systems often used as a platform to support block oriented RAID storage management typically operate in a single processor architecture. Cooperation in sharing access to memory and peripheral devices in a multi-core processor environment often makes it difficult to achieve the required real-time response required for low level management of storage devices in a storage subsystem (such as a RAID storage subsystem). Still further, data management layer applications are typically designed to operate in a second processor complex totally separate and independent of the clock oriented RAID storage management features of a storage system. Such data management applications, as presently practiced, operate on servers or other compute nodes and appliances external to the storage system.

Thus it is an ongoing challenge to effectively utilize multi-core processors in a single storage system controller to integrate higher level data management applications with lower level block oriented storage management features such as RAID storage management.

SUMMARY

The present invention solves the above and other problems, thereby advancing the state of the useful arts, by providing methods and systems for allowing a real-time storage element to simultaneously reside along with general purpose data management layer applications all integral within a storage system. A hypervisor manages the multiple processors of a multi-core processor to define a first virtual machine for the block level storage management and one or more additional virtual machines for each of one or more data management layer applications. The hypervisor allows a single, multi-core processor to efficiently process low, block level storage operations in real-time while tightly integrating higher level data management applications all within the storage system.

In one aspect hereof, a system including a plurality of storage devices and a storage controller coupled to the plurality of storage devices. The storage controller has a multi-core processor, each processor core operable in parallel. The system also includes a hypervisor operable in the storage controller to manage the multiple processor cores. The hypervisor is adapted to define a first virtual machine operable on a first processor core and to define a second virtual machine operable on a second processor core. The system also includes a block level storage management process operable on the first virtual machine and a data management application process operable on the second virtual machine and adapted to communicate with the block level storage management process.

Another aspect hereof provides a method operable in a system having a multi-core processor coupled to host systems and coupled to storage devices. The method includes booting a real-time hypervisor in the multi-core processor in response to a reset of the multi-core processor. The method operates the real-time hypervisor to create a first virtual machine and a second virtual machine. The method operates the first virtual machine to initialize operation of a real-time operating system and a non-symmetric multi-processor (SMP) aware, real-time block level storage management process in the first virtual machine. The method also operates the second virtual machine to initialize operation of an industry standard general purpose operating system and a data management application in the second virtual machine. The method then operates the first virtual machine and the second virtual machine under control of the real-time hypervisor to provide data management application processing and block level storage management processing within the system.

Still another aspect hereof provides a storage controller adapted for coupling one or more host system to a plurality of disk drives. The controller includes a multi-core processor, each processor core operable in parallel wherein the multi-core processing system is coupled to the plurality of storage devices. The storage controller also includes a hypervisor operable to manage the multiple processors and adapted to define a first virtual machine and to define a second virtual machine. The controller includes a real-time operating system operable in the first virtual machine and a Redundant Array of Independent Disks (RAID) storage management process operable on the first virtual machine under control of the real-time operating system. The controller also includes a general purpose operating system operable in the second virtual machine and a data management application process operable on the second virtual machine. The hypervisor further comprises a communication path coupling the second virtual machine with the RAID storage management process.

DETAILED DESCRIPTION OF THE DRAWINGS

Figure 1:
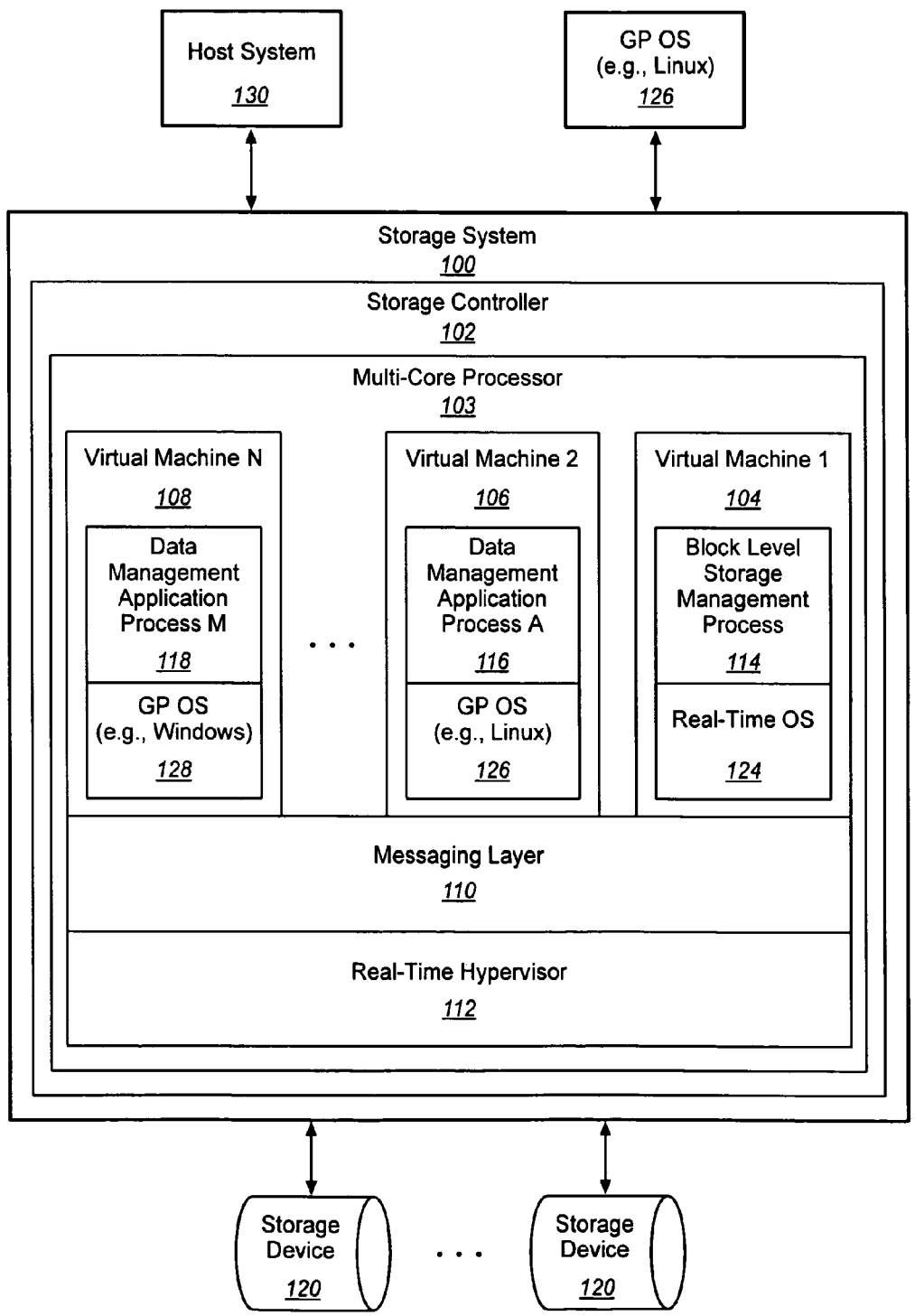
FIG. 1 is a block diagram of an exemplary storage system enhanced in accordance with features and aspects here to use a multi-core processor on the storage controller under the control of a real-time hypervisor to operate a data management application and a block level storage management both within the storage controller.

FIG. 1 is a block diagram of a storage system 100 enhanced in accordance with features and aspects hereof to provide a storage controller 102 utilizing a multi-core processor 103 under control of a real-time hypervisor 112. Real-time hypervisor 112 is operable to manage the multi-core processor 103 to define multiple virtual machines each adapted for performing aspects of processing in the storage system 100. Each virtual machine defines a virtual computing environment in which one or more computer programs may be executed. In particular, a first virtual machine 1 104 is defined to perform real-time control operations for a block level storage management process. Virtual machine 1 104 is initialized in cooperation with hypervisor 112 by booting a real-time operating system 124 and then commencing operation of block level storage management process 114. Virtual machine 1 104 is preferably configured by real-time hypervisor 112 to provide required real-time response for desired performance levels in operation of block level storage management process 114. Block level storage management process 114 is then operable under control of the real-time operating system 124 in virtual machine 1 104 to interact with storage devices 120 for purposes of processing I/O operations received from various sources. One source for such I/O operation requests may be one or more host systems 128 and 130 coupled to storage system 100 via any of several well-known communication media and protocols. Thus, in one aspect, virtual machine 1 104 operating within storage controller 102 under supervision of real-time hypervisor 112 performs all standard processing for host generated requests for read and or write access to storage devices 120 as well as managerial requests to configure aspects of the storage system operation.

Block level storage management process 114 represents any process performed within one of the core processors of the multi-core processor for managing block level operations on storage devices 120. For example, block level storage management process 114 may provide RAID storage management features to manipulate one or more logical volumes distributed over the various storage devices 120. As will be readily apparent to those of ordinary skill in the art, storage controller 102 may include various customized circuits for assisting in the block level storage management such as RAID storage management. For example, various direct memory access (DMA) circuits redundancy computation and check circuits may be utilized by operation a virtual machine 1 104 to enhance the performance and reliability of block level storage management process 114 within virtual machine 1 104.

A second virtual machine 2 106 may be created by operation of real-time hypervisor 112 to perform other data management functions within the storage system 100. Such data management features at present are provided by external components and appliances—external to the storage system 100 or at least provided by computational means external to the storage controller 102 of the storage system 100. By contrast, storage system 100 includes storage controller 102 wherein the multiple core processors are allocated under control of the real-time hypervisor 112 to provide both the lower level block level storage management features and higher level data management applications integrated within a single storage controller 102 of the storage system 100. Second virtual machine 2 106 is initialized by booting a general purpose operating system 126 and then initiating processing of data management application process "A" 116. In an exemplary embodiment, the first virtual machine 1 104 in conjunction with the hypervisor 112 provide a standard BIOS-like interface for all other virtual machines to initialize. Thus virtual machine 2 106 may "boot" a general purpose operating system as though it has standard BIOS level support provided by the block level operations in virtual machine 1 104.

Data management application process "A" 116 may provide a variety of higher level data management functions including, for example, a network file service (NFS) capability. Further, for example, data management application process "A" 116 may provide virtualization services, virtual tape services, network attached storage (NAS) services, etc.

Still further virtual machines such as virtual machine N 108 may be created by operation of real-time hypervisor 112 for operation on further core processors of the multi-core processor of storage controller 102. Similar to virtual machine 2 106, virtual machine N 108 is initialized by booting a general purpose operating system 128 and then commencing operation of data management application process N 118. Thus, any number of additional virtual machines beyond the first virtual machine 1 104 may be provided by operation of real-time hypervisor 112 each adapted for a particular data management application process.

Those of ordinary skill in the art will readily recognize that additional virtual machines may also represent redundant virtual machines each running a redundant copy of a corresponding data management application.

Real-time hypervisor 112 may also provide a common messaging layer 110 to provide streamlined communications and messaging means coupling each of the virtual machines 104, 106, and 108. Thus, for example, virtual machine 2 106, by operation of its data management application process "A" 116 may exchange information with virtual machine one 104 and its block level storage management process 114 for purposes of performing data management operations relating to storage device 120. Messaging layer 110 may also serve to support INT13 BIOS processing requests on behalf of other data management layer applications and associated general purpose operating systems operable in other virtual machines other than the first virtual machine. Messaging layer 110 represents any suitable communication means including, for example, a shared memory accessible to each of the core processors of the multi-core processor 103 in storage controller 102. Utilizing such a shared memory, a messaging protocol may be provided by messaging layer 110 such that the operating system (124, 126, and 128) in each virtual machine (104, 106, and 108, respectively) may exchange information with another of the virtual machines utilizing a coupling driver structure integrated within each operating system. Alternatively, messaging layer 110 may represent, for example, a common bus structure coupled to each of the core processors of the multi-core processor 103 in storage controller 102. Still further, by way of example, messaging layer 110 may represent a remote procedure call inter-process communication structure whereby each virtual machine (104, 106, and 108) may invoke function calls to perform a desired exchange of information with another virtual machine.

Real-time hypervisor 112 may be any of several well-known, commercially available hypervisor products such as TenAsys (from TenAsys Corporation—www.tenasys.com). Other hypervisor programs are generally available but do not offer some of the real-time features of TanAsys. Other exemplary hypervisors include: VMware (from VMware, Inc.—www.vmware.com), Xensource (from Citrix Systems—www.xensource.com), etc. Real-time hypervisor 112 generally provides real-time operational control in that it provides prioritization capabilities to assure that one virtual machine (e.g., first virtual machine 1 104) retains a higher priority relative to operation of other virtual machines to allow desired performance in processing I/O operations by block level storage management process 114. General purpose operating systems 126 and 128 may be any of several well-known, commercially available operating system programs including, for example, Microsoft Windows, UNIX, Linux, etc. Real-time operating system 124 may be, for example, VxWorks (from Wind River—www.windriver.com) or any other real-time operating system adapted for use in embedded system real-time control functions.

Figure 2:
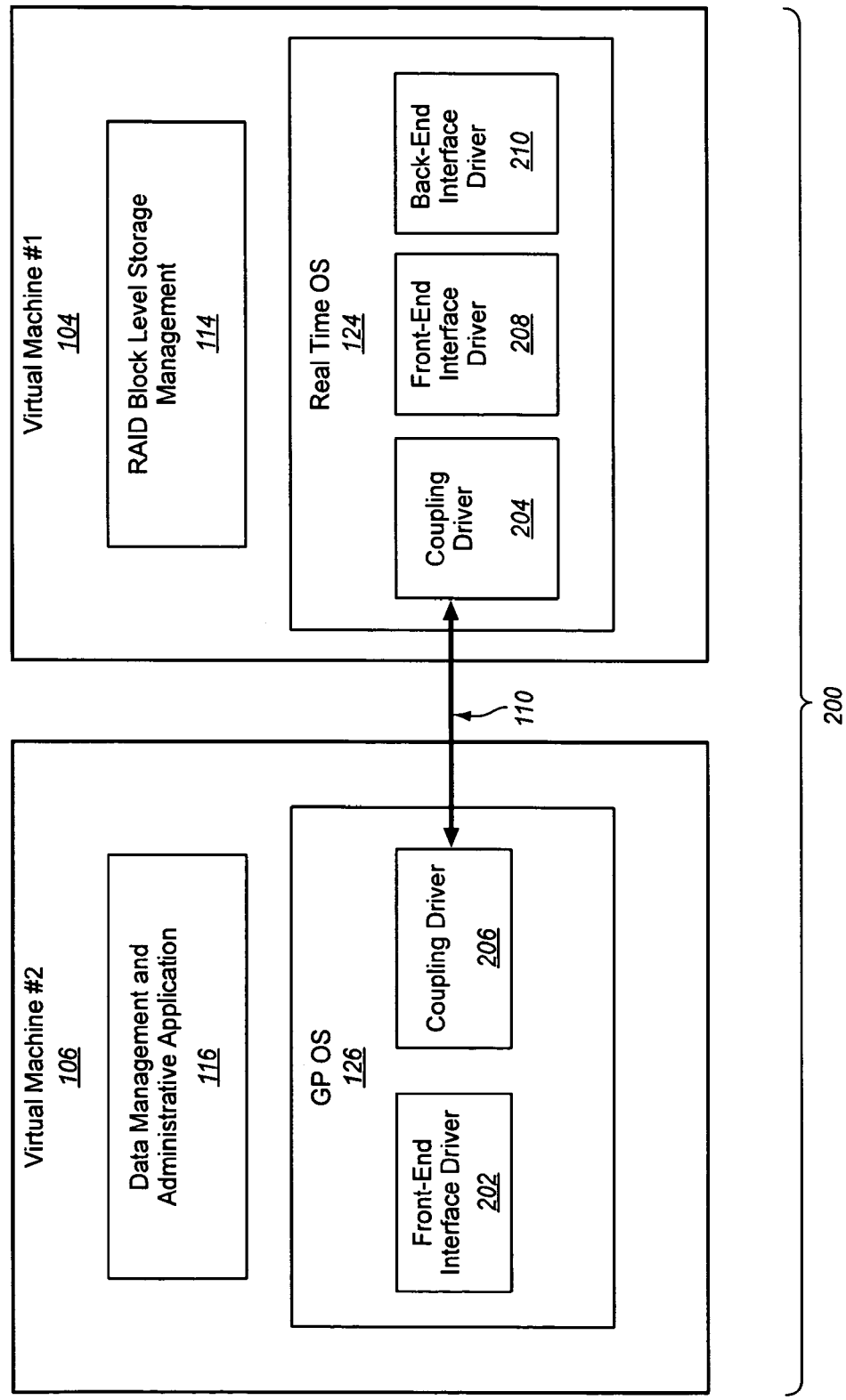
FIG. 2 is a block diagram providing exemplary additional details of the functional elements and modules within both the first and second virtual machines of FIG. 1.

FIG. 2 is a block diagram of a system 200 similar to storage system 100 of FIG. 1 in which two virtual machines have been created by a hypervisor (not shown). Virtual machine 1 104, as noted above, provides an environment for real-time operating system 124 to execute and thus an environment in which a block level storage management process 114 (e.g., RAID storage management) may operate. Further, system 200 includes a second virtual machine 2 106 created by a hypervisor (not shown). Virtual machine 2 106 provides an environment in which a general purpose operating system 126 is executed and thus an environment in which data management application 116 may be performed.

Exemplary a real-time operating system 124 operable in virtual machine 1 104 may include front-end interface driver 208 adapted to couple the RAID block level storage management 114 to host systems for direct interaction to process host system generated I/O requests for access to storage devices. In addition, real-time operating system 124 may include a back-end interface driver 210 adapted to permit RAID block level storage management 114 to interact with the storage devices (e.g., disk drives 120 of FIG. 1) for purposes of storing and retrieving information. General purpose operating system 126 operable in virtual machine 2 106 may include front-end interface driver 202 to permit coupling of virtual machine 2 106 to one or more attached host systems.

In addition, both real-time operating system 124 and general purpose operating system 128 may include a coupling driver (204 and 206, respectively) to permit virtual machine 1 104 and virtual machine 2 106 to exchange information through the messaging layer 110. Utilizing coupling drivers 204 and 206 and messaging layer 110, data management administrative application 116 and RAID block level storage management 114 may exchange information in a manner similar to a host system exchanging information with virtual machine 1 102 via front-end interface 208. Thus, in accordance with features and aspects hereof, a data management application function may be integrated within the storage system on a virtual machine operable on one of the core processors of a multi-core processor storage controller where another processor of the multi-core processor is used to provide block level storage management.

Figure 3:
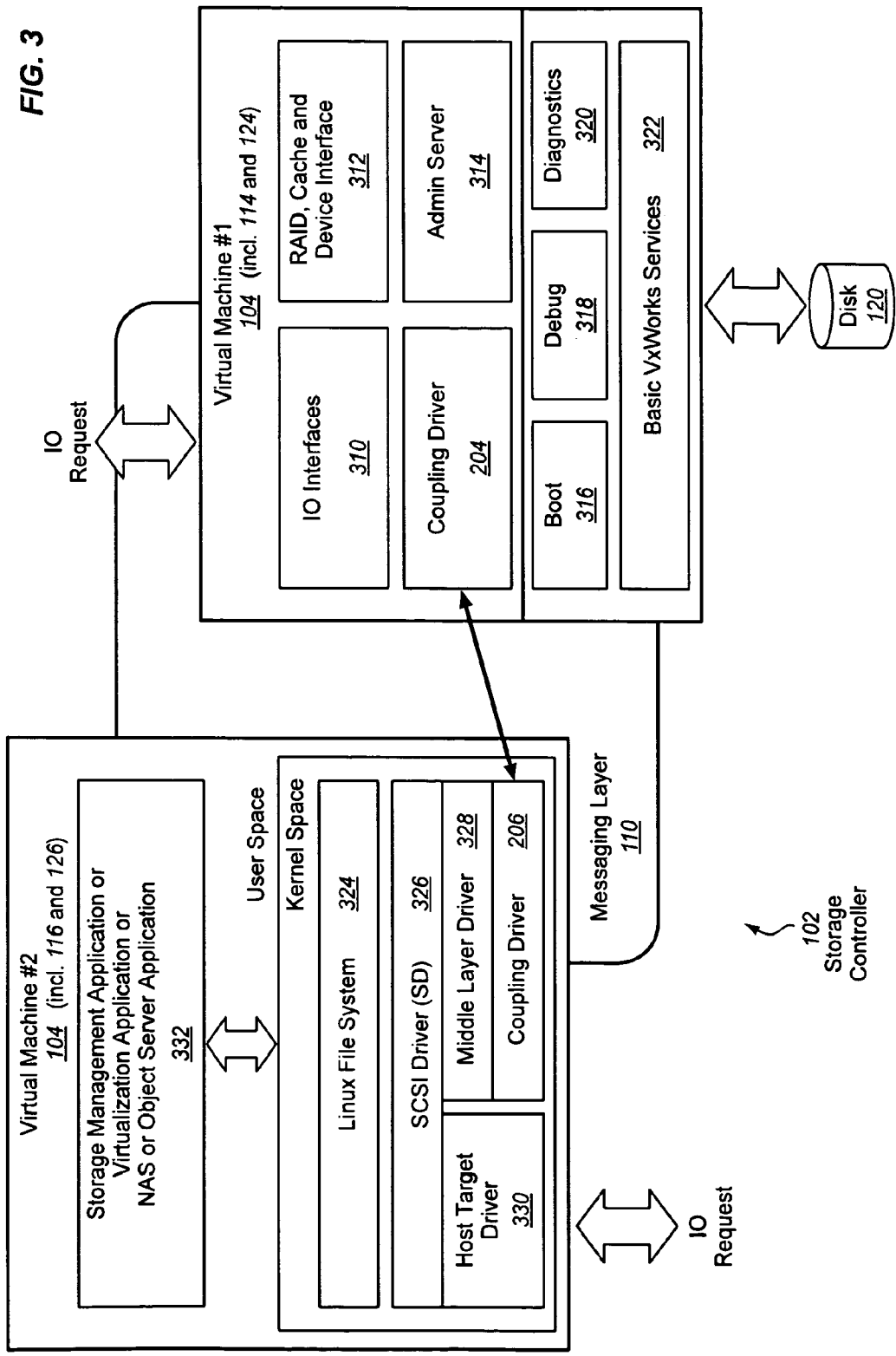
FIG. 3 is a block diagram providing exemplary additional details of the functional elements and modules within both the first and second virtual machines of FIG. 1.

FIG. 3 is a block diagram showing additional details an exemplary embodiment of virtual machine 1 104 operable to perform block level storage management and of virtual machine 2 106 operable to provide data management applications integrated within multiple core processors of storage controller 102. Virtual machine 1 104 (including block level storage management process 114 and real-time operating system 124 may include) may include I/O interfaces 310 for coupling virtual machine 1 104 to one or more host systems. I/O interfaces 310 therefore includes appropriate circuitry for coupling virtual machine 1 104 to one or more host systems as well as suitable programmed instructions or custom circuits for managing appropriate protocols and communication with attached host systems. RAID, cache, and interface module 312 represents RAID storage management features including cache memory management and storage device interfaces as is typical in most RAID storage controllers. Module 312 therefore includes suitable memory circuits, memory controller circuits, redundancy generation and checking circuits, and other programmed instructions and custom circuits suitable for providing RAID storage management. Further included within module 312 may be back-end interface circuits for coupling the RAID and cache management functions to one or more disks 120. Admin server module 314 may provide administrative services such as for configuration and maintenance of the storage subsystem. Basic VxWorks services 322 represents basic operating system support of the VxWorks real-time operating system as well known to those of ordinary skill in the art. Associated with such basic services may be boot module 316 for effectuating boot of the VxWorks operating system in the virtual machine and initial operation thereof to commence block level storage management operation. Also associated with basic VxWorks services 322 may be debug module 318 and diagnostics module 320 providing support features for design engineers and field support engineers working on the storage system.

Virtual machine 2 106 (including data management application 116 and general purpose operating system 126 such as Linux) may operate to divide the memory space of the virtual machine 2 106 into "kernel" or "operating system" memory space in which aspects of the general purpose operating system 126 are operable and "user" memory space in which the data management applications 332 are operable. General purpose operating system 126 (e.g. Linux) typically provides a filesystem interface 324 for access to an underlying storage system for purposes of the data management application functions 332 and for access to attached host systems desiring to interact with the data management application in virtual machine 2 106. Filesystem interface 324 generally interacts with a SCSI device (SD) driver 326 that abstracts host and storage devices for use by the filesystems 324. Through this SCSI device driver 326, the filesystem interface 324 on behalf of the data management application 332 may interact with host systems coupled through a host target driver 330 and may interact with a SCSI middle layer driver 328 for access to SCSI storage devices through the coupling driver 206 and the messaging layer 110.

In addition, as discussed above, virtual machine 1 104 may include coupling driver 204 for controlling exchanges with virtual machine 2 106 through its corresponding coupling driver 206. Messaging layer 110 provides the communication medium through which coupling driver 204 and coupling driver 206 may exchange information. Virtual machine 2 106 directs storage requests generated by data management applications 332 to coupling driver 206 through filesystem 324, SCSI device driver 326, and middle layer driver 328. Similarly, RAID storage management in module 312 of virtual machine 1 104 receives and responds to such requests via its corresponding coupling driver 206. Thus a data management application (e.g., 332) and RAID block level storage management (e.g., 312) may operate on the same storage controller 102—each operating in its own virtual machine (106 and 104, respectively)—each virtual machine operating on its own core processor of a multi-core processor of the storage controller 102—all under supervisory control of a real-time hypervisor.

Those of ordinary skill in the art will readily recognize numerous additional and equivalent components and modules within a fully functional storage system. Such additional and equivalent components are omitted herein for simplicity and brevity of this discussion. Thus, the structures of FIGS. 1, 2, and 3 are intended merely as a representative of exemplary embodiments of features and aspects hereof to provide data management applications integrated with block level storage management distributed on core processors of a multi-core processor in a storage controller.

Figure 4:
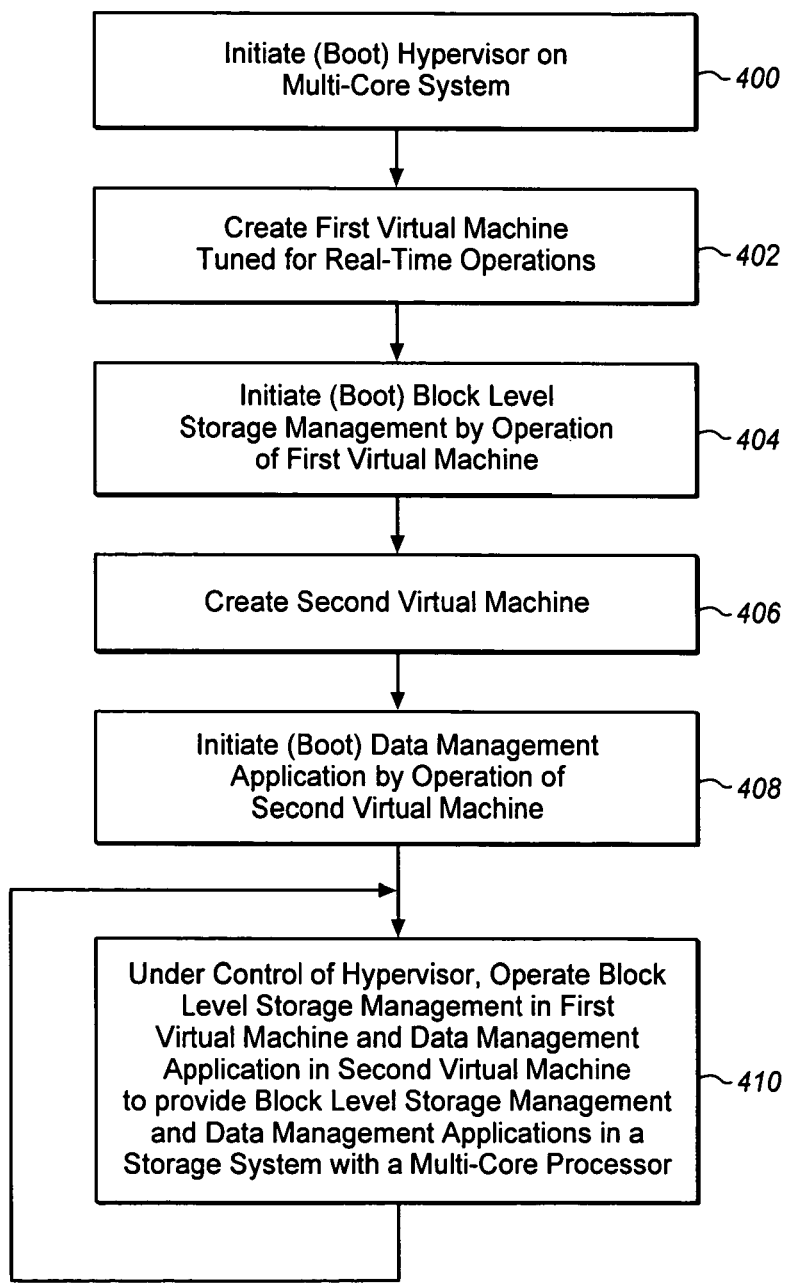
FIG. 4 is a flowchart describing an exemplary method in accordance with features and aspects hereof to operate a multi-core processor on a storage controller under control of a real-time hypervisor to enable operation of a data management application and block level storage management all within the same storage controller.

FIG. 4 is a flowchart describing an exemplary method in accordance with features and aspects hereof to provide for coordination of one or more data management applications and block level storage management in virtual machines operable on various core processors of a multi-core processor storage controller. The method of FIG. 4 may be operable, for example, in the structures described above in FIGS. 1 through 3. Step 400 represents processing to initialize or boot a hypervisor program on the multi-core processor storage controller. As noted above, in one exemplary embodiment, a real-time hypervisor program retains control over all the core processors of a multi-core processor in the storage controller. The real-time hypervisor then creates two or more virtual machines (each associated with a corresponding core processor) and distributes data management applications and block level storage management processes among the various virtual machines.

Step 402 then represents processing of the hypervisor to create a first virtual machine in which block level storage management processes will be operable. In particular, the first virtual machine may be defined for optimal real-time control processing such as may be required for I/O interaction between the block level storage management process, attached host systems, and attached storage devices. For example, one processor of the multi-core processor may receive and process block level I/O requests from attached hosts. Other processors of the multi-core processor storage controller may be more general purpose in nature and thus less well adapted to the performance requirements of real-time control in processing of I/O requests. Step 404 then initializes or boots the block level storage management processing in the first virtual machine. Additional details of the processing of step 404 are discussed further herein below. In general, a real-time operating system may first be loaded or booted followed by initiation of the block level storage management process. Upon completion of processing of step 404, the block level storage management features of the storage controller will be available both for interaction with attached host systems and for interaction with other virtual machines yet to be defined and initialized.

Step 406 creates a second virtual machine intended for use by one or more data management application processes. As noted above, the second virtual machine may be associated with a core processor of the multi-core processor in the storage controller that is general purpose in nature as distinct from those core processors better tuned for real-time control as required in the block level storage management processing. Step 408 then initializes or boots the data management application for operation in the newly defined second virtual machine. Additional details of the processing of step 408 are discussed further herein below. In general, a general purpose operating system may be loaded or booted followed by commencement of the operation of the data management application operable in conjunction with the general purpose operating system.

Those of ordinary skill in the art will further recognize that block level storage management operable in the first virtual machine may be loaded/booted and initialized in conjunction with a commercially available real-time operating system (such as VxWorks). Alternatively, the block level storage management process may be written as a customized process that does not require features and services of any particular operating system. Similarly, the data management application operable in the second virtual machine may be booted and initialized in conjunction with a commercially available general purpose operating system (such as Windows or Linux) or may be designed as a customized application/process that does not require the features and services of a commercially available operating system.

Following completion of step 408, both the data management application and the blocked level storage management processing will be available for normal operation within the storage controller as indicated by step 410. Thus, attached host systems may interact directly with the block level storage management (e.g., RAID storage management) requesting access to storage devices coupled to the storage controller. Further, attached host systems may interact directly with the data management application requesting other higher level services. The data management application operable in the second virtual machine may then interact, as needed, with the block level storage management processing operable in the first virtual machine in order to perform requested processing on behalf of an attached host.

Figure 5:
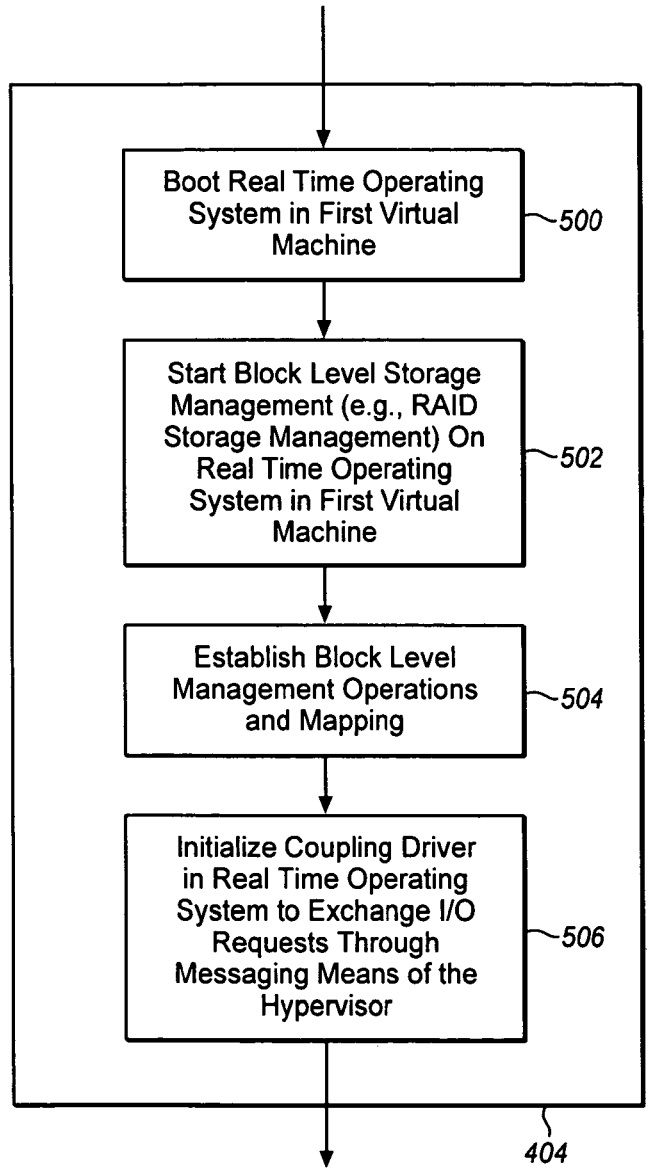
FIGS. 5 through 7 provide exemplary additional details of steps of the method of FIG. 4.

FIG. 5 is flowchart providing exemplary additional details of the processing of step 404 to initialize or boot block level storage management within the first virtual machine. Step 500 first boots a real-time operating system to provide real-time processing services for use by the block level storage management processing. For example, VxWorks real-time operating system may be booted in the first virtual machine defined by the hypervisor as discussed above. Step 502 then starts the block level storage management process (e.g., RAID storage management) operable in conjunction with the real-time operating system—both executing within the first virtual machine under control of the hypervisor. Following initialization of the block level storage management, step 504 represents any processing required to make block level storage management fully operable to respond to storage requests from attached host systems. This may entail, for example, completing configuration processing to identify logical volumes distributed over one or more of the storage devices in the system. Lastly, step 506 represents processing to initialize the coupling driver associated with the real-time operating system of the first virtual machine for processing exchanges with other virtual machines. General purpose operating systems and data management applications that may operate in other virtual machines may then be booted/loaded by access (e.g., BIOS INT13 access) to the storage system through the fully initialized and operational block level storage management in the first virtual machine in cooperation with the hypervisor. Once so initialized, other virtual machines created by the hypervisor and operable on other core processors of the multi-core processor of the storage controller may issue I/O requests to the block level storage management (e.g., RAID storage management) through the coupling driver operable in the first virtual machine.

Figure 6:
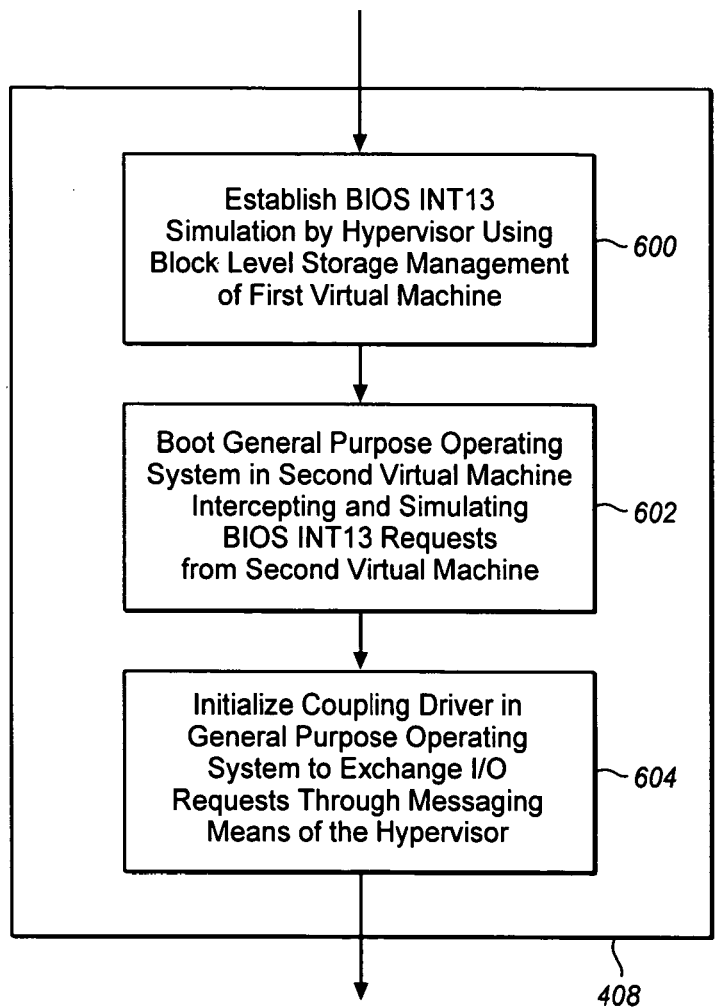

FIG. 6 is a flowchart providing exemplary additional details of the processing of step 408 of FIG. 4 to initialize or boot data management applications in the second virtual machine (under control of the hypervisor). Step 600 establishes simulation capabilities within the real-time hypervisor to allow it to simulate BIOS INT13 features for use in booting or initializing operations in the second virtual machine. At step 602, the general purposes operating system will be booted to start operation in the second virtual machine. The hypervisor messaging layer provides an interface to the general purpose operating system to be initialized and to the data management application operable in conjunction therewith. The boot process of the general purpose operating system generally utilizes standard BIOS INT13 function invocations. BIOS INT13 functions are well known to those of ordinary skill in the art and are often used for access to a storage device (e.g., a disk drive) through the BIOS of a standard personal computer/workstation. The simulation capabilities of the hypervisor and its messaging layer allow the BIOS INT13 function invocations to be intercepted during the boot and initialization processing of the general purpose operating system in the second virtual machine. The intercepted BIOS INT13 function invocations are forwarded by the messaging layer associated with the hypervisor to the first virtual machine to be processed as I/O requests within the block level storage management. Once the general purpose operating system is booted in the second virtual machine, step 604 initializes a coupling driver in the general purpose operating system to enable the operating system and data management applications in the second virtual machine to directly communicate storage requests to the block level storage management.

Those of ordinary skill in the art will readily recognize that the steps of FIG. 6 may be repeated for each additional virtual machine on which one or more data management applications may be operating under control of a general purpose operating system (or as a dedicated custom application built without the need for an underlying operating system).

Figure 7:
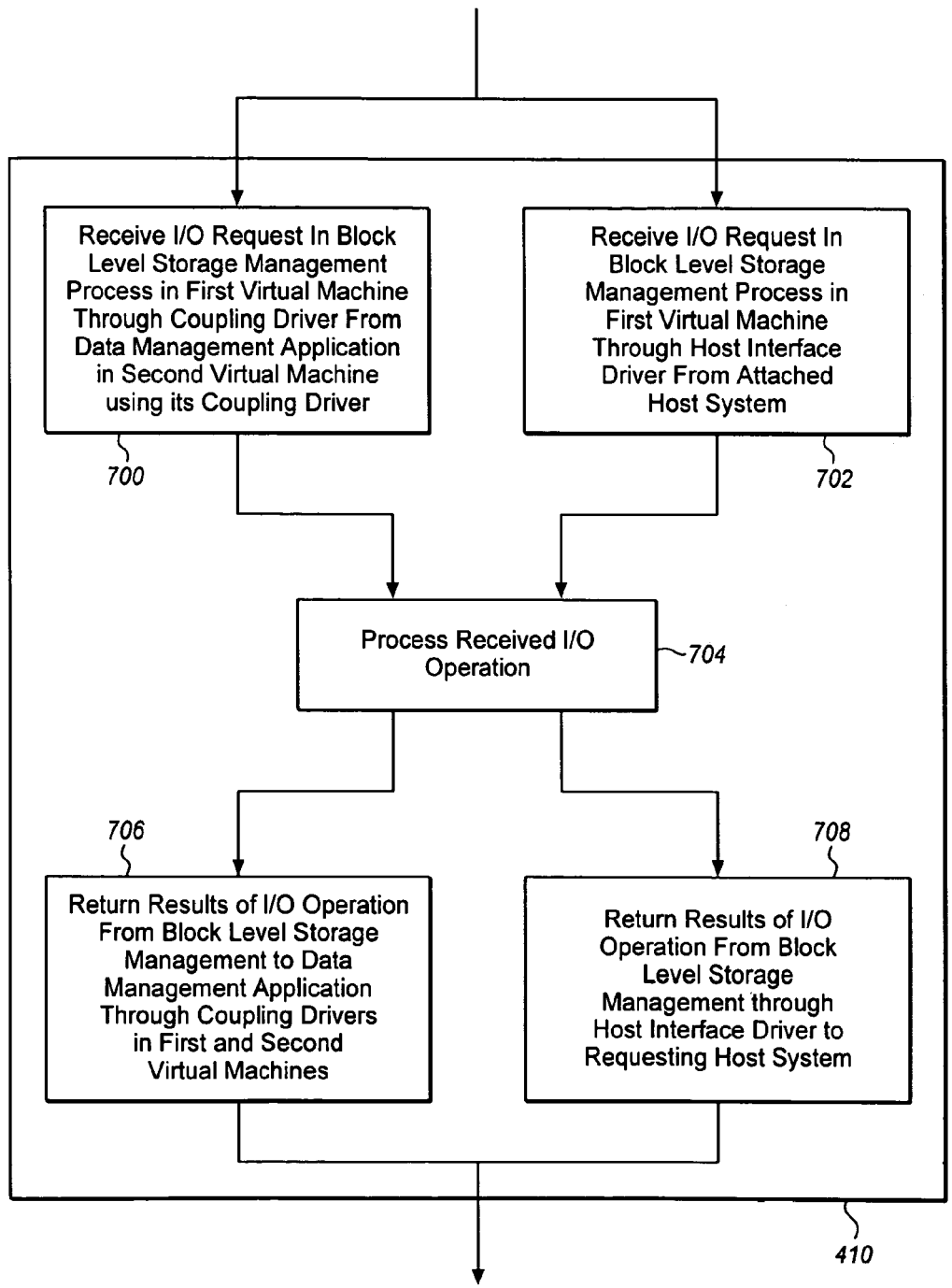

FIG. 7 is a flowchart providing exemplary additional details of the processing of step 410 of FIG. 4 to operate the storage controller under control of the hypervisor with the first virtual machine providing block level (e.g., RAID) storage management services and with a second and potentially other virtual machine providing higher level data management services. In particular, step 410 receives an I/O request from either of two (or more) sources. One source of requests is the data management application/applications operable under control of the hypervisor in the second virtual machine. Another source of such requests is one or more host systems attached to the storage controller. Step 700 represents processing that receives an I/O request in the block level storage management operable in the first virtual machine from any of the one or more data management applications operable in the other virtual machines. As noted, each data management application may be operable in cooperation with a general purpose operating system operable in the same virtual machine as the application. With or without the services of such a general purpose operating system, the data management application may communicate through a coupling driver module and a messaging layer provided by the hypervisor to the block level storage management process operating in the first virtual machine. Step 702 represents similar processing within the block level storage management operating in the first virtual machine to receive an I/O request from an attached host system. The first virtual machine may receive such host system generated I/O requests through any of several well known, commercially available communication media and protocols.

In both cases, common processing in step 704 processes the received I/O request by performing the requested access to the storage devices identified in the request. Steps 706 and 708 then return the results of the completed I/O request to the requesting source. If the request was received from a data management application operating in the same storage controller in a virtual machine defined by the hypervisor, then the results are returned by step 706 through coupling drivers in the first virtual machine the requesting second or other virtual machine. A messaging layer associated with the hypervisor provides a communication medium for the coupling drivers to exchange the returned results of the I/O request. Where the I/O request was received from an attached host system, step 708 returns the results of the completed I/O request to the requesting host system.

Those of ordinary skill in the art will readily recognize numerous additional and equivalent steps that may be performed in the methods of FIGS. 4 through 7. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A system comprising:
   a plurality of storage devices;
   a storage controller coupled to the plurality of storage devices and having a multi-core processor, each processor core operable in parallel;
   a hypervisor operable in the storage controller to manage the multiple processor cores and adapted to define a first virtual machine operable on a first processor core and to define a second virtual machine operable on a second processor core;
   a first process operable on the first virtual machine, wherein the first process is a Redundant Array of Independent Disks (RAID) storage management process; and
   a second process operable on the second virtual machine and adapted to communicate with the first process, wherein the hypervisor further includes a communication path coupling the second virtual machine with the first process, further wherein the communication path comprises an interrupt simulator to enable the second virtual machine on the second processor to communicate with the first process on the first virtual machine on the first processor to boot and initialize an operating system operable in the second virtual machine on the second processor.

2. The system of claim 1 wherein the multi-core processor comprises an Intel architecture multi-core processor.

3. The system of claim 1 further comprising:
   a real-time control operating system operable in the first virtual machine adapted to control operation of the first process in the first virtual machine.

4. The system of claim 1, wherein the general purpose operating system operable in the second virtual machine controls operation of the second process in the second virtual machine.

5. The system of claim 1
   wherein the hypervisor is a real-time hypervisor, and
   wherein the real-time hypervisor is adapted to manage the first virtual machine to provide real-time control and response capabilities to the first process operable in the first virtual machine.

6. The system of claim 1
   wherein the one or more services including one or more of: Network File System (NFS) service, object storage management service, content addressable storage management service, virtual tape service, storage virtualizing service, storage replication service, storage copy service, storage clustering service, and storage security service.

7. The system of claim 1
   wherein the second process includes a data management application that provides Network File System (NFS) services to attached computing systems.

8. The system of claim 1, wherein the interrupt simulator comprises a BIOS INT13 simulator.

9. The system of claim 1, wherein the hypervisor is further adapted to define a third virtual machine and to enable the third virtual machine to communicate with the first process on the first virtual machine to boot and initialize an operating system of the third virtual machine that is different from the operating system operable in the second virtual machine.

10. A method operable in a storage controller, comprising:
    operating a real-time hypervisor to define a first virtual machine on a first processor and to define a second virtual machine on a second processor;
    operating the first virtual machine to initialize operation of a first process in the first virtual machine, wherein the first process includes a Redundant Array of Independent Disks (RAID) storage management process; and
    operating the second virtual machine to initialize operation of a second process in the second virtual machine,
    wherein the hypervisor includes a communication path coupling the second virtual machine with the first virtual machine, wherein the communication path comprises an interrupt simulator to enable the second virtual machine on the second processor to communicate with the first process on the first virtual machine on the first processor to initialize an operating system operable in the second virtual machine on the second processor.

11. The method of claim 10, wherein the step of operating the second virtual machine to initialize further comprises:
    operating the second virtual machine under the control of the hypervisor; and
    booting a general purpose operating system in the second virtual machine, the general purpose operating system including a coupling driver adapted to communicate through the hypervisor with the first process operable in the first virtual machine.

12. The method of claim 10, wherein the step of operating the first and second virtual machines further comprises:
    generating, within the second process, a request for block level storage management operations;
    directing the generated request using the coupling driver through the hypervisor to the first process;
    processing the request in the first process; and
    returning results from processing of the request through the hypervisor to the second process using the coupling driver.

13. The method of claim 10 wherein the second process provides one or more services to attached host systems.

14. The method of claim 13 wherein the one or more services includes one or more of: Network File System (NFS) service, object storage management service, content addressable storage management service, virtual tape service, storage virtualizing service, storage replication service, storage copy service, storage clustering service, and storage security service.

15. The method of claim 10, wherein the intercepted interrupt comprises a BIOS INT13 interrupt.

16. The method of claim 10 further comprising operating the real-time hypervisor to define a third virtual machine, wherein the real-time hypervisor further enables the third virtual machine to communicate with the first virtual machine to initialize an operating system of the third virtual machine that is different from the operating system operable in the second virtual machine.

17. A storage controller adapted for coupling one or more host system to a plurality of storage devices, the controller comprising:
    a multi-core processor, each processor core operable in parallel wherein the multi-core processing system is coupled to the plurality of storage devices;
    a hypervisor operable to manage the multiple processors and adapted to define a first virtual machine on a first processor of the multi-core processor and to define a second virtual machine on a second processor of the multi-core processor;
    a storage management process operable on the first virtual machine under control of a real-time operating system in the first virtual machine, wherein the storage management process is a Redundant Array of Independent Disks (RAID) storage management process;

a data management application process operable on the second virtual machine, wherein the hypervisor further comprises:

a communication path coupling the second virtual machine with the storage management process, wherein the communication path comprises an interrupt simulator to enable the second virtual machine to communicate with the storage management process on the first virtual machine on the first processor to boot and initialize a general purpose operating system on the second virtual machine on the second processor.

18. The storage controller of claim 17, wherein the communication path further comprises a messaging means coupled between the first virtual machine and the second virtual machine, wherein the general purpose operating system includes a coupling driver adapted to communicate with the messaging means, wherein the real-time operating system includes a coupling driver adapted to communicate with the messaging means, and wherein the data management application is adapted to use the coupling driver in the general purpose operating system to communicate with the storage management process through the coupling driver in the real-time operating system.

19. The storage controller of claim 17, wherein the data management application process is adapted to provide one or more services to attached host systems, the one or more services including one or more of: Network File System (NFS) service, object storage management service, content addressable storage management service, virtual tape service, storage virtualizing service, storage replication service, storage copy service, storage clustering service, and storage security service.

20. The storage controller of claim 17, wherein the interrupt simulator comprises a BIOS INT13 simulator.

* * * * *